Patented Nov. 8, 1938

2,136,329

UNITED STATES PATENT OFFICE 2,136,329

FLEXIBLE COMPOSITIONS

Howard L. Bender, Bloomfield, N. J., assignor to Bakelite Corporation, New York, N. Y., a corporation of Delaware No Drawing. Application February 16, 1933, Serial No. 657,107

13 Claims. (Cl. 106—22)

In the field relating to synthetic resins and resinoids (i. e. resinous condensation products transformable by heating from an initial soluble and fusible state to a final practically insoluble and infusible state) the general aim has been to obtain either solutions or brittle solids. The solutions have been found useful as varnishes for the impregnating or bonding of fibrous materials, for surface coatings or for cements. The brittle solids are primarily intended for grinding and mixing with a filler, such as wood flour, to produce compositions that can be molded into finished articles.

The present invention comprises synthetic amorphous products akin to synthetic resins, in that resin-forming ingredients can be used, but which are physically of a distinctively different character from either solutions on the one hand or brittle solids on the other and which have properties that fit them for applications to which neither solutions nor brittle solids can be adapted. In appearance, flexibility, consistency, retention of form and resistance to flow they are solid or viscous plastics comparable to crepe rubber, and like crepe rubber they are pressure-deformable without permanent rupture; when released from pressure they remain more or less in the deformed condition. In this deformable plastic condition they can be rolled into films, and the prepared films can be applied as coatings to flexible materials like fabrics, leather, rubber, etc.; they can be extruded into tubes, sheets, etc. for use as coverings for wires, cables, etc. in the place of rubber; and they are satisfactory substitutes for oxidized linseed oil in the manufacture of linoleums and the like, and for bonding cements without the need of added solvents in the manufacture of laminated and similar articles, as canvas gear stock, sandpaper, etc.

The products of this invention, however, are unlike crepe rubber not only in being synthetic but also in their capability of being given a permanent set by the action of heat alone, i. e. without the addition of a vulcanizing or oxidizing agent of the active sulfur or oxygen types. In this respect of heat-change they resemble resinoids and in general exhibit other properties of the type of resinoid to which they are most nearly related; for example, those of the phenolic type are chemically inert, resistant to acids, water, common solvents, insoluble in mineral oils, etc. After the products in the deformable plastic condition have been shaped, they can accordingly be set by heat treatment to flexible tough articles, not dependent on the inclusion of fibers or other shock resistant fillers to impart utility, and free from stickiness or tackiness on the surface.

In order that the invention may be adequately disclosed several examples are given. It is to be understood that these examples are illustrative merely and are not expressive of the full scope of the invention.

*Example I.*—Synthetic substances in accordance with this invention can be obtained from a phenol-fatty oil complex reacted with an agent having a mobile methylene group (inclusive of the substituted methylene group), such as an aldehyde, a substituted aldehyde or a ketone, to a gel condition. The product is not a mixture of the ingredients used but a homogeneous compound having characteristics distinctly different from a fatty oil on the one hand and from a phenolic resin or resinoid (i. e. heat-hardenable resin) on the other hand; for instance, it is not subject to oxidation like a fatty oil nor does it exhibit the brittleness or the conchoidal fracture commonly associated with a resin, and these synthetic substances furthermore exhibit a superior resistance to the action of oil or water.

As an illustration a phenol fatty oil complex is made by reacting phenol with tung oil until the reaction mass indicates that free tung oil is not present to any substantial extent; this reaction is preferably carried out in the presence of a catalyst such as phosphoric acid. A typical mixture comprises 100 parts of phenol to 150 parts of tung oil with 1–2 parts of phosphoric acid heated under a reflux for about 3 hours at 180 to 190° C. The product at this stage is a liquid at ordinary temperatures. The complex so obtained is then reacted with hexamethylenetetramine in substantially molecular proportions; that is, for the typical mixture recited, about 20 parts of hexamethylenetetramine are added. Heating is continued for about 1 hour at 150° C. and then for about 5 hours at 105° C. to insure dehydration. This treatment results in a crumbly solid gel which cannot be spread by a calendering process. But upon mechanically working or milling as by repeated rolling between hot rolls (100° C.) for about 5 minutes or mixing in a blade mixer and extruding in the form of macaroni and again mixing while the temperature is about 110 to 120° C., the mass is gradually changed to a translucent, homogeneous deformable gel which can be spread by calendering rolls into continuous films. The same result can be attained by milling on cold rolls from about thirty minutes to an hour or more. The milled product as it comes from the rolls is strikingly like crepe rubber in color, appearance and mechanical properties.

The mechanical working accordingly effects a decided structural change. The change is exemplified for instance by the decrease in viscosity; thus a sample of the reaction mass above described was cut before milling in an equal weight of toluene and the solution at 25° C. showed a viscosity of 4000 centipoises, while a sample of the same mass after milling for 1 hour on cold rolls under the same conditions showed a viscosity of only 1000 centipoises. At least a 10 per cent increase in flow or plasticity of the mass through mechanical working is apparently associated with the structural changes characteristic of the deformable film-forming gel of this invention; and additional properties which distinguish the deformable gel in its preferred form as obtained by milling are insolubility in oils, insolubility but sometimes swelling in acetone, softening but no flowing under the action of heat alone, flowing under the combined action of heat and pressure, and inherent flexibility at room temperatures.

In preparing a phenol-oil complex any member of the group of phenols can be used. When for instance, equivalent parts of commercial cresol are used in place of phenol, it is possible to mix all the ingredients at the beginning, though apparently the amount of oil that is reacted or combined under this procedure is not as great as by the procedure in two stages heretofore explained. Likewise other fatty oils, drying or non-drying, or esters of fatty or unsaturated monobasic organic acids can be used in place of all or part of tung oil as for example, linseed, soya bean, fish, perilla, castor, rapeseed, cotton seed, corn oil, etc.; and not only oils or esters but high-boiling free saturated or unsaturated acids—stearic, palmitic, oleic, linolic, linolenic, etc.—can be used either in place of or in conjunction with them, and in fact it is found that acids promote the reaction. As catalytic agents in the initial reaction there can be used instead of phosphoric acid, aluminum chloride, sulfur chloride, hydrochloric acid, sulfuric acid, antimony sulfides, oxalic acid, pyrogallic acid, acetic anhydrides, rosin, etc. as well as neutral or alkaline bodies as paraform, hexamethylenetetramine, etc. The conditions of operation may be changed as well, such as the temperatures and periods of heating; these conditions will depend upon the specific ingredients and properties of the composition desired. As a rule, however, the heating is applied at the lowest temperatures, concomitant with a practical rapidity of operation, that will be conducive to a maximum of flexibility in the product.

It is also to be understood that the proportions of fatty oil, ester and the like included can be varied within wide limits. If for instance the proportion by weight of tung oil (or an equivalent amount of other fatty oil) exceeds 1½ parts by weight to 1 part of phenol (or an equivalent of any other phenolic body) the excess oil may not be completely reacted but some may be present as free oil, as for instance when heating 300 parts of tung oil with 100 parts of phenol. But even so it is found that the oil present in excess does not interfere with the use of or alter the properties of the material to an objectionable degree. In general an increased flexibility follows in proportion to the excess of oil present. A drier can, however, be included to oxidize any excess oil if desired without serious detriment.

Solutions can be used in place of the solvent-free products described; for instance, solutions may be found desirable in order to insure a homogeneous dispersion of the reagents and afford a control of the reaction. When solutions are used, it is preferable to pour the solutions of the reacted ingredients into thin layers (about ½ inch) which are then heated at low temperatures (105° C.) to drive off the volatile content until a viscous condition results; this material can be mechanically treated in substantially the same manner as the solvent-free composition. Or the solution can be sprayed or floated on a smooth surface aluminum, nickel, or chromium plates, mercury amalgamated tin, or silver, sodium silicate, rubber, etc., and there heated until a firm film is obtained that can be milled into a homogeneous pressure deformable mass and then applied in the general manner of handling natural rubber as described.

*Example II*.—The invention is not restricted to synthetic masses obtained from a compound prepared with a methylene or substituted methylene agent. For example a product was made by reacting 200 parts by weight of tung oil, 100 parts of phenol and 5 parts of phthalic anhydride under a reflux at 190° C. for 7 hours; no methylene compound was included. The product was a gel solid at both 100° C. and at room temperature, and a suspension of a sample in an equal weight of toluene gave a viscosity of 1060 centipoises. The product was disintegrated for an hour in a heavy duty blade mixer at 100° C. and a sample suspension in toluene showed a viscosity of 950 centipoises. The mass was transferred to mixing rolls and milled at 100° C. for 10 minutes. The milled product gave a viscosity test of 628 centipoises and was suitable for industrial use as demonstrated by a calendering operation. Various other drying or fatty oils, etc. and phenols as explained in Example I can be substituted, and other polybasic organic acids with or without the addition of mono-basic organic acids or their esters can be used in place of phthalic anhydride.

*Example III*.—Another synthetic material of non-phenolic character was made from 4 parts by weight of phthalic anhydride, 2 parts of glycerine and 1 part of an acid obtained from castor oil, at 220°C. for 1 hour. It set to a gelled infusible solid as determined by a ring and ball type melting point method. A sample dissolved in an equal weight of acetone gave a viscosity test of 4000 centipoises. The material was crumbly when broken down by a pass between rolls, but as the milling was continued at 90° C. it became more adhesive until after a milling of 15 minutes it was a homogeneous sheet suitable for calendering. The milled product showed a viscosity of but 25 centipoises, and tested by ring and ball method it gave a melting point of 195° C., thus showing a very great increase in flow due to the milling operation and furthermore a change from an infusible to a fusible form. Equivalent products are obtainable from other polybasic acids, polyhydric alcohols and fatty oils, esters and/or acids as set out in Example I, and these can be milled into deformable homogeneous masses in accordance with this invention.

*Example IV*.—As further illustrative of the generic aspect of the invention in its relation to the various fundamental types of synthetic resin products, 60 grams of urea were heated with 60 grams of paraform under mildly basic conditions with 40 grams of methyl hexalin ester of adipic acid present. Heating was continued about an hour at 130 to 140° C. until the product set to a gel. The gel was suspended in ethyl lactate and found to have a viscosity of 3500 centipoises. The gel was flexible at 100° C. and was milled at this temperature for 10 minutes at pressures at about 600 pounds to the square inch. The milled product was suspended in ethyl lactate and showed a viscosity of 3000 centipoises; it could be calendered or made into a film in a manner similar to the products of the other examples.

While the foregoing illustrations of the invention make evident that it is not peculiarly associated with any particular type or class of synthetic resins, it is a distinguishing characteristic of the substances here described that milling or mechanical working increase their plasticity, thereby excluding those which do not exhibit this property. In other words, the mere fact that a synthetic resin can be hardened by the application of heat is not in itself an indication that it is also one which can be milled or mechanically worked into a deformable film-forming product. Nor is a rubbery appearance a sufficient indication of the products here described; for instance, they have no relation to the so-called rubbery product resulting from a failure to control an initial resin reaction or dehydration whereby there is a conversion to an infusible insoluble mass which has no known utility and which does not lend itself to treatment to make it usable; such a mass progressively hardens to a brittle condition and it is not subject to increase in plasticity by a milling operation. Concerning synthetic resin and allied formations it may be pointed out that there are two recognized and distinct phenomena that take place; one is a true chemical polymerization into larger molecules as a reaction progresses and the other is a physical change or rearrangement of molecules into loosely bound aggregates forming net-works or "brush heaps" that tie and support the mass into a gel structure. It is seemingly those formations wherein the physical change predominates resulting in gels that yield products suitable for the purposes of this invention, though the conditions for directing that change are not known with sufficient definiteness to enumerate them; as the examples demonstate, the change is not dependent on the ingredients used, and the operating conditions afford no criteria. So far the only determinative factors deduced are based on the product itself, namely, that the final resinous or semi-resinous mass is a gel and not a liquid at the temperature of milling, and that milling causes an increase in plasticity or reversely a decrease in viscosity.

In addition to the ingredients mentioned, substances which have a plasticizing or other desired modifying effect on the compositions can be included, as for example, ethyl abietate, butyl ether of ethylene glycol, diethyl phthalate, etc. Their addition is at times advantageous to assist in an extruding or shaping operation or to exert some modifying effect on the properties of the products. Particularly the inclusion of flocculent or fluffy substances or those having an apparent low specific gravity, such as basic lead carbonate, carbon black, etc. is sometimes desirable on account of the surface effect or the lessening of stickiness. Another addition that is useful is paraffin wax which yields a composition that promotes the resistance to the action of mineral oils as well as lessening any tendency to adhere on the calendering rolls; other substances like stearine, calcium stearate, waxes, or wax-like products as chlorinated naphthalene are similarly useful for reducing this tendency. The compositions furthermore can be mixed or used conjointly with known synthetic resins and resinoids, such as the known forms of phenol-formaldehyde condensation products, glycerol-phthalic anhydride esters, urea condensation products, etc.; this admixture or conjoint use may be desirable where flexibility can be sacrificed to secure increased hardness. Likewise natural resins and their derivatives as rosin, ester gum, etc. can be included. Furthermore rubber itself can be incorporated; or a rubber-like product as the so-called mineral rubber can be added to impart its property of heat resistance whereby an increased measure of heat resistance is given to the mixture. Any of these substances or admixtures of them, are preferably added to the product prior to the mechanical working, though they can be incorporated during the rolling or other equivalent treatment.

Modification of any of the foregoing products by the inclusion of a wax as suggested can be made to yield compositions of increased flexibility even though the waxes themselves show a crystalline nature. This is particularly true of additions of a chlorinated naphthalene. For instance a mass containing about equal parts of a gel as herein described and a solid halogenated naphthalene can be extruded and hardened into flexible sheet, tubing or covered wire. To illustrate, a mixture to include a halogenated naphthalene can be prepared by reacting 100 parts of cresol, 180 parts of tung oil, 1 part of phosphoric acid (8%) for about 3 hours at 180° C. whereupon 25 parts of hexamethylenetetramine are added; upon further heating a viscous mass is obtained, and this after mixing about an equal weight of melted halogenated naphthalene, is heated for about 2 hours at 105° C. or to a light gel stage when hot. This product, in addition to being extruded, can be milled by rolling between cold rolls into sheets or passed between hot rolls and then transferred onto canvas, etc., for coating the canvas or other surface. The amount of chlorinated naphthalene can be made much less or more than the proportion given, and the other ingredients changed as herein set forth.

When the pressure-deformable products resembling crepe rubber of the present invention are applied to a flexible sheet base such as cloth, paper, leather, etc. the ordinary calendering roll machines can be used. The products are preferably heated, say to about 80-100° C., so that they are soft enough to be spread as a film on the calendering roll by a transfer roll or other means; or a small amount of solvent as toluene, butyl alcohol, etc. sufficient to give a pasty mass can be included either before or after milling so that the mass can be spread with lower pressure while cold. In this condition the mass is somewhat sticky. The flexible base is pressed into contact by a pressure roll whereby the base draws the film off the calendering roll, the thickness of the film being controlled by the pressure on the roll and by the temperature as well as by the state of the film-forming product. These conditions should be such as to insure penetration into the base by the film sufficient to firmly anchor the film. The coated base may be used for some purposes as cable tape with the surface in the sticky adhering condition or in such condition as is sticky under pressure. Or the coated base may then be passed through an oven to cause a transformation of the coating to a non-sticky smooth film or surface layer. In this manner a flexible cloth can be had similar to "oil cloth" but having a superiority thereover in resistance to oil and water, absence of oxidation, permanence of flexibility, etc. as indicated above. When used for sandpaper manufacture, grit is preferably sprinkled and pressed into the coating while sticky and before baking.

In the foregoing explanation it is to be noted that the working of the mass on hot rolls or equivalent mechanical working in the absence of any filler is like that of the milling of rubber whereby the product is broken down or disrupted into the softer, sticky, deformable condition as here defined. The same change in the mass takes place when working it together with a filler as involved in the manufacture of inlaid linoleum and similar articles. The crumbly solid before being milled or mechanically worked can be thoroughly mixed with ground cork, wood flour, pigments, etc. in the same manner as oxidized linseed oil is manipulated, as for example by mixing in a blade mixer, extruding in the form of macaroni and again mixing, under a temperature of about 110 to 120° C. This treatment simultaneously causes a change in the binder to the homogeneous deformable character. The mixture is rolled between hot rolls for a few minutes to further insure a homogeneous deformable product as herein described. When this mixture is pressed in thin continuous layers or cut into blocks or designs and placed on a canvas or other backing and then heated for about 5 minutes at 100 to 110° C., a linoleum with a smooth, non-sticking surface is obtained that does not require further heat treatment, though it may be advisable to pass the material through an oven at about 100 or 110° C. for about ½ hour to further stiffen the resinous binder and thereby increase its durability. Alternatively, the mixture can be shredded and applied in this form to the backing and thereafter pressed with heating for a brief period. The heat treatment required for the product is therefore markedly different from that which an oxidized linseed oil mixture requires, namely, contact with hot air for two or more weeks after its application to a backing to overcome its stickiness and give it firmness unless the oxidation is speeded up with the addition of drier. In any case the oxidizing oil mixture requires air or other oxidizing conditions, whereas this invention deals with products which harden either in presence or absence of air and under oxidizing, neutral or reducing conditions.

Linoleum made in accordance with the foregoing disclosure is further distinguished from oxidized oil compositions in that oxidation is not relied upon to secure the final product and the hardening is due primarily to a polymerization action that takes place; consequently there is not the progressive deterioration from continued exposure to the atmosphere which occurs with an oxidized binder. Furthermore the products here described seem to coat the fibers of an incorporated filler sufficiently to form an intimate contact with them and thereby impart to the fibers their own characteristics of water resistance, insolubility, etc.

A surprising result that follows the application of the pressure deformable products here described to a flexible or pliable base in place of a solution in solvents is the marked increase in flexibility of a so coated base in comparison with one that is impregnated by a solution. This may be accounted for in part by the explanation that there is but slight penetration of the fabric or other base by the coating in spite of the decided adherence, and that consequently the movement of the fibers of the base is not obstructed. For this reason the deformable products are well adapted for applications where their protective properties are demanded and a high degree of flexibility if required; such applications are, for instance, so-called patent or enameled leathers; rubber surfaces such as rolls, printers blankets, tubes, etc.; materials for apparel as raincoats, etc.

The remarkable toughness of the products furthermore permits their extrusion into tubes either with or without the addition of any fibrous backing, filler or other support. Tubes can be extruded fine enough to cover wires or large enough for cables, etc. and subsequent baking may be obviated by the application of high pressure and/or heating of the extrusion nozzles sufficiently to yield a non-tacky surface. This can be accomplished for example by taking the milled gel in sheet or other form and feeding it continuously through an extrusion die in a machine of the type commonly used in the rubber industry; the die is heated to about 100 to 110° C. so that as the material passes through it takes a permanent set in the shape imparted by the die. The tubing obtained is not affected by atmospheric conditions, oil or water and therefore makes it superior to the hitherto known coverings for electrical wires; the substance of the tubing is furthermore characterized by an insulating value comparable to that of rubber, and the permanent flexibility or elasticity of the substance along with its other desirable properties render it particularly valuable as insulation for electrical conductors.

The film-forming deformable stage or condition of the foregoing products whereby they can be rolled, extruded, picked up as films and otherwise worked in a manner similar to rubber or oxidized linseed oil distinguishes them from the varnishes or solutions on one hand and the solid brittle resins on the other. The products in this condition permit the preparation of coatings or films of appreciable thickness in a single operation and also their application to open or porous fabrics as well as other materials in sharp distinction from varnishes or solutions which can only deposit relatively thin and penetrative coatings on account of their fluid condition. In contrast with solid brittle resins, these pressure deformable film-forming products can be calendered or spread, and this with or without the incorporation of fibrous fillers, and with apparatus and under conditions for which the solid resins that are rendered fluid by heat alone are not suited. In further contrast, the products when heat-hardened are flexible and tough in themselves independent of any additional agent; but unlike rubber they are set to this stage without the assistance of a sulfur or oxygen type vulcanizing agent and solely by the action of heat.

This application is a continuation in part of a prior application for Flexible phenolic compositions, Serial No. 486,872 filed Oct. 6, 1930.

I claim:

1. Process of preparing a plastic composition characterized by a crepe rubber appearance from a heat-hardening resin which comprises forming a solid gel from the resin and mechanically disrupting the gel without fusion.

2. Process of preparing a plastic composition characterized by a crepe rubber appearance from a heat-hardening resin which comprises forming a solid gel from the resin and mechanically disrupting the gel without fusion, said heat-hardening resin including as a reactant a member of the class of fatty acids and their esters.

3. Process of preparing a plastic composition characterized by a crepe rubber appearance from a heat-hardening resin which comprises forming a solid gel from the resin and mechanically disrupting the gel without fusion, said resin comprising the reaction product of a phenol, an agent having a mobile methylene group and a member of the class of fatty acids and their esters.

4. Process of preparing a plastic composition characterized by a crepe rubber appearance from a heat-hardening resin which comprises forming a solid gel from the resin and mechanically disrupting the gel without fusion, said resin comprising the reaction product of a polyhydric alcohol, a polybasic acid and a member of the class of fatty acids and their esters.

5. Process of preparing a plastic composition characterized by a crepe rubber appearance from a heat-hardening resin which comprises forming a solid gel from the resin and mechanically disrupting the gel without fusion, said resin comprising the reaction product of a urea, an agent having a mobile methylene group and a member of the class of fatty acids and their esters.

6. As a new composition of matter a plastic resin resembling crepe rubber in appearance and comprising a heat-hardening resin in the state of a solid gel and disrupted without fusion, said resin in the plastic disrupted form being characterized by a decrease in viscosity over the non-disrupted gel and capable of taking a permanent set under the action of heat.

7. As a new composition of matter a plastic resin resembling crepe rubber in appearance and comprising a heat-hardening resin in the state of a solid gel and disrupted without fusion, said resin in the plastic disrupted form being characterized by a decrease in viscosity over the non-disrupted gel and capable of taking a permanent set under the action of heat, and the resin including as a reactant a member of the group of fatty and monobasic organic acids and their esters.

8. As a new composition of matter a plastic resin resembling crepe rubber in appearance and comprising a heat-hardening resin in the state of a solid gel and disrupted without fusion, said resin in the plastic disrupted form being characterized by a decrease in viscosity over the non-disrupted gel and capable of taking a permanent set under the action of heat, and the resin comprising a reaction product of a phenol, an agent having a mobile methylene group and a member of the class of fatty and unsaturated monobasic acids and their esters.

9. As a new composition of matter a plastic resin resembling crepe rubber in appearance and comprising a heat-hardening resin in the state of a solid gel and disrupted without fusion, said resin in the plastic disrupted form being characterized by a decrease in viscosity over the non-disrupted gel and capable of taking a permanent set under the action of heat, and the resin comprising a reaction product of a polyhydric alcohol, a polybasic acid and a member of the class of fatty and unsaturated monobasic acids and their esters.

10. As a new composition of matter a plastic resin resembling crepe rubber in appearance and comprising a heat-hardening resin in the state of a solid gel and disrupted without fusion, said resin in the plastic disrupted form being characterized by a decrease in viscosity over the non-disrupted gel and capable of taking a permanent set under the action of heat, and the resin comprising a reaction product of a urea, an agent having a mobile methylene group and a member of the class of fatty and unsaturated monobasic acids and their esters.

11. As a new composition of matter a plastic resin resembling crepe rubber in appearance and comprising a heat-hardening resin in the state of a solid gel and disrupted without fusion, said resin in the plastic disrupted form being characterized by a decrease in viscosity over the non-disrupted gel and capable of taking a permanent set under the action of heat, and the resin including a solid halogenated naphthalene as a modifying agent.

12. Process of preparing a plastic composition characterized by a crepe rubber appearance from a heat-hardening resin which comprises forming a solid gel from the resin and mechanically disrupting the gel without fusion, said resin being selected from the group consisting of the reaction product of a phenol with an agent having a mobile methylene group and a member of the class of fatty acids and their esters, the reaction product of a polyhydric alcohol with a polybasic acid and a member of the class of fatty acids and their esters, the reaction product of a urea with an agent having a mobile methylene group and a member of the class of fatty acids and their esters, and the reaction product of a phenol with a polybasic acid and a member of the class of fatty acids and their esters.

13. As a new composition of matter a plastic resin resembling crepe rubber in appearance and comprising a heat-hardening resin in the state of a solid gel and disrupted without fusion, said resin in the plastic disrupted form being characterized by a decrease in viscosity over the non-disrupted gel and capable of taking a permanent set under the action of heat, the resin being selected from the group consisting of the reaction product of a phenol with an agent having a mobile methylene group and a member of the class of fatty acids and their esters, the reaction product of a polyhydric alcohol with a polybasic acid and a member of the class of fatty acids and their esters, the reaction product of a urea with an agent having a mobile methylene group and a member of the class of fatty acids and their esters, and the reaction product of a phenol with a polybasic acid and a member of the class of fatty acids and their esters.

HOWARD L. BENDER.